C. F. KETTERING AND W. A. CHRYST.
ELECTRICAL SYSTEM FOR ENGINES.
APPLICATION FILED FEB. 19, 1916.
1,311,402.
Patented July 29, 1919.
2 SHEETS—SHEET 1.
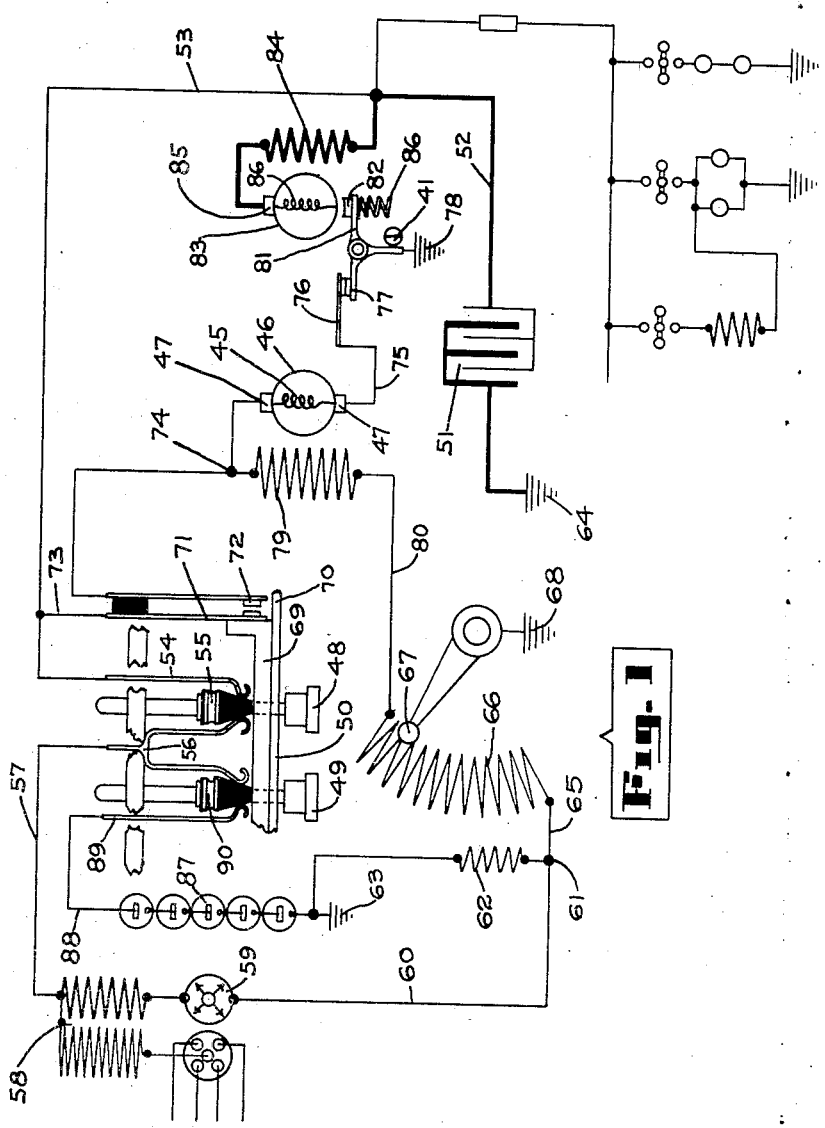

C. F. KETTERING AND W. A. CHRYST.
ELECTRICAL SYSTEM FOR ENGINES.
APPLICATION FILED FEB. 19, 1916.
1,311,402.
Patented July 29, 1919.
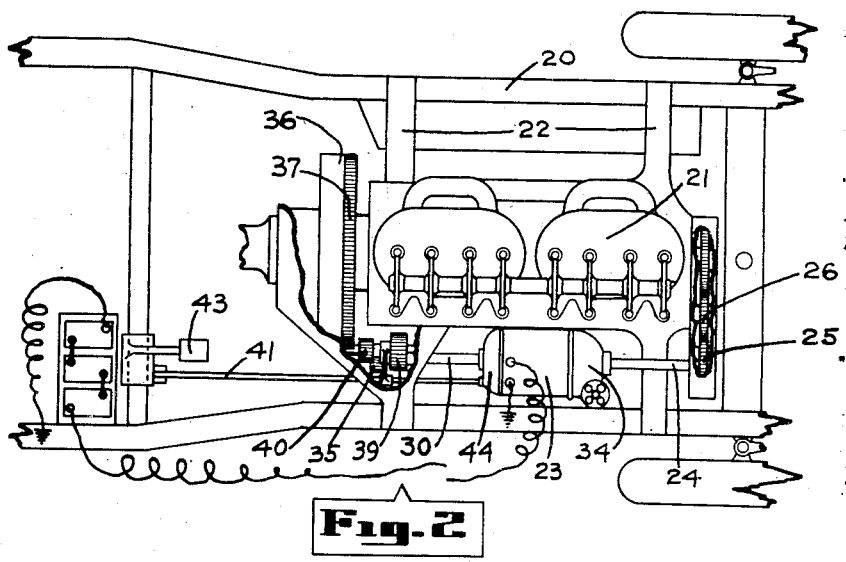
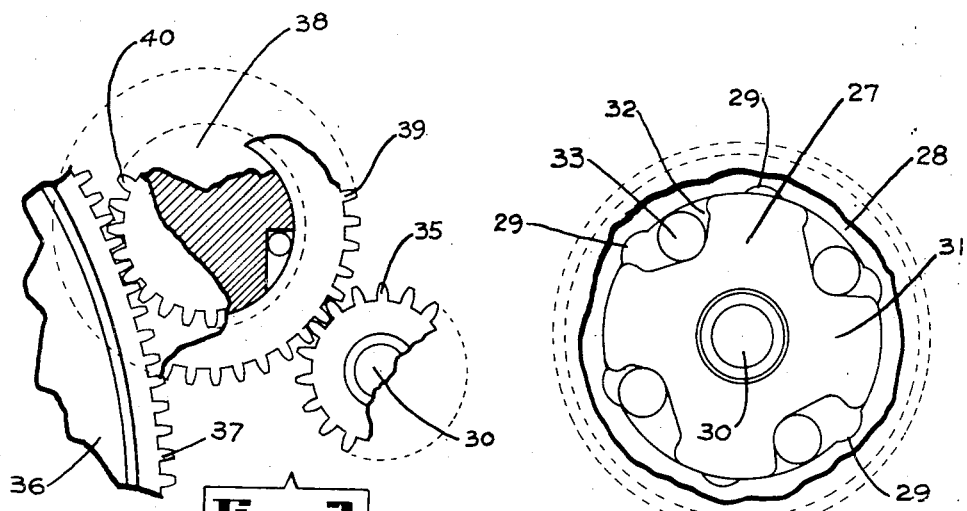

UNITED STATES PATENT OFFICE.

CHARLES F. KETTERING AND WILLIAM A. CHRYST, OF DAYTON, OHIO, ASSIGNORS TO THE DAYTON ENGINEERING LABORATORIES COMPANY, A CORPORATION OF OHIO.

ELECTRICAL SYSTEM FOR ENGINES.

1,311,402.          Specification of Letters Patent.    Patented July 29, 1919.

Original application filed June 24, 1914, Serial No. 846,911. Divided and this application filed February 19, 1916. Serial No. 79,339.

*To all whom it may concern:*

Be it known that we, CHARLES F. KETTERING and WILLIAM A. CHRYST, citizens of the United States of America, residing at Dayton, county of Montgomery, and State of Ohio, have invented certain new and useful Improvements in Electrical Systems for Engines, of which the following is a full, clear, and exact description.

The present invention relates to an improvement in electrical systems of generation, distribution and control, and is especially adapted for use in conjunction with vehicles of the type wherein a prime mover or power generator, such as an internal combustion or explosion engine, or in fact any power element is utilized which requires an initial starting movement to be transmitted thereto, in order to bring the same into operation under its own power. Then this engine, when operating under its own power, is used to store up energy for future starting operations and for other purposes.

As an example of the above, the present invention may comprise a dynamo electric machine adapted to be operated as a motor, in order to transmit power to the power generator for starting purposes, or as a generator, to furnish current for charging the storage battery or accumulator, or to supply current to an ignition system which is installed on, and which furnishes ignition to the explosion or combustion engine used as a prime mover or power generator.

Among the objects of the present invention is to provide a system of the type referred to above, wherein an ignition system and a generating system are included, in combination with a signaling device, whereby a signal or indication will be given at such times as either the ignition system or the generating system are in operative condition, and are not actually providing ignition for the engine or delivering current of a voltage greater than the battery voltage.

A further object of the present invention is to provide an electrical system which may be used for starting combustion engines, which will include an electric machine capable of an initial operation as a motor to facilitate the connecting up of the electric machine to the engine for starting purposes, in combination with a signaling device which will be brought into operation as soon as this initial motor movement is imparted to the electric machine and will continue in operation throughout the motor movement of the machine.

In the issued patent to Charles F. Kettering, No. 1,150,523, and in the co-pending applications of Charles F. Kettering, Serial No. 621,512, filed April 17, 1911, Patent 1,171,055, Feb. 8, 1916; Serial No. 721,237, filed September 19, 1912, Patent 1,240,348, Sept. 18, 1917, and the co-pending application of Charles F. Kettering and William A. Chryst, Serial No. 778,934, filed July 14, 1913, Patent 1,241,990, Oct. 2, 1917, there is disclosed an electrical system particularly adapted for use on motor vehicles employing a combustion engine as a power unit, which includes an ignition system for said engine, and which also includes an electric generator and storage battery with circuit connections therebetween.

In certain of said systems an automatic circuit-breaker is included in the circuit connections, whereby when the voltage of the storage battery or accumulator becomes greater than the electric generator, the circuit connections will be broken, thereby preventing the current from flowing from the storage battery back through the generator, and thereby operating the same as a motor.

In the present improvements the circuit connections between the accumulator and the generator are not provided with any such automatic circuit-breaker, and it is therefore desirable to provide a signaling device which will indicate that current is flowing from the battery back through the generator, and to also indicate that current is flowing through the ignition system at such times as the ignition system is not in actual operation.

The present application is a division of our co-pending application, Serial No. 846,911, filed June 24, 1914, wherein there is fully shown and described a system including a dynamo electric machine, adapted to be operated as a motor in order to transmit power to the engine for starting purposes, or as a generator to furnish current for charging a storage battery or other accumulator, or to supply current to work circuits.

Further objects and advantages of the present invention will appear from the description, reference being had to the accompanying drawings, wherein a preferred form of the present invention is clearly illustrated.

In the drawings:

Figure 1 is a diagrammatic view of the electrical circuits and connections which may be employed in connection with the present invention.

Fig. 2 is a fragmentary plan view of an automobile chassis, including an engine, and illustrating certain parts of the present invention, as applied to said chassis and engine.

Fig. 3 is a fragmentary view of the coupling gearing between the starting device and the flywheel of the engine, which is brought into use for starting purposes. This view also clearly shows the over-running clutch included in said gearing.

Fig. 4 is a fragmentary view of the front end clutch and its associated parts.

Referring to the drawings and more particularly to Figs. 1 and 2, it will be noted that the present invention is illustrated as being installed on a motor vehicle, which may be of any approved type. The side frames of the vehicle chassis are indicated by the numerals 20, while the engine 21 is suitably supported therebetween, by means of the cross-supporting elements 22.

The dynamo electric machine 23 is preferably mounted adjacent to the engine, as is clearly shown in Fig. 2.

This electric machine is adapted to be connected with the engine and then operated as a motor for starting purposes. As soon as the engine becomes self actuating, the means for coupling the electric machine to the engine for starting purposes, is disconnected and a different set of coupling mechanism connects the electric machine to the engine, whereby the machine is operated as a generator to store up power in a suitable accumulator for future starting operations, or to supply current for ignition, lighting, or any other desirable purposes.

The means for coupling the dynamo electric machine 23 up to the engine, to operate the machine as a generator, comprises a shaft 24, one end of which is secured to the pinion 25, which meshes with the timing gear pinion 26. The opposite end of said shaft is connected to one of the coöperating elements of the friction clutch 27, which will now be described, and which is clearly shown in Fig. 4.

This clutch 27 comprises an external casing 28, having depressions 29 formed on the interior wall thereof at determined intervals. On the periphery of this external casing, a series of gear teeth are provided which engage with a pinion (not shown), which tends to drive the movable element of an associated ignition system.

In the co-pending application of C. F. Kettering and W. A. Chryst, Serial No. 752,733, filed March 7, 1913, Patent 1,229,754, June 12, 1917, an electrical system having a similar method of driving the movable elements of the ignition system, is clearly set forth, and therefore the parts described in said co-pending application will not be referred to in the present case, unless reference becomes necessary in order to clearly set forth the present invention.

In the present invention, the armature shaft 30, (see Fig. 4) is connected with a cam element 31, which fits within the exterior casing 28 above mentioned. This cam element is provided with a series of angular cut-away portions 32, wherein suitable friction gripping elements 33, preferably in the shape of rollers or balls, are positioned.

The function and manner of operation of the above mentioned clutch, as embodied in the present invention, will now be described.

When the electric machine is to be used as a motor for starting purposes, the armature of the electric machine (see Figs. 2 and 3) is adapted to be connected to the engine through what might be termed a shiftable reduction gear, in such a manner that the speed of the armature shaft 30 will be much greater than that of the engine, and therefore greater than that of the shaft 24. Therefore, the armature must necessarily run ahead of the shaft 24, and one of the functions of this clutch is to permit it to operate in this manner.

The cam element 31 of the clutch 27 will therefore rotate relative to the external member 28 of said clutch, and the rollers 33 will consequently be moved over the depressions 29. As these rollers tend to pass the depressions 29, they will be displaced, with the result that as they come into contact with the depressed portion of the external element and are then forced back into normal position, a clicking noise will be created. The above operation will only take place at such times as the armature of the generator is operating relative to and independently of the engine driven shaft 24.

The object of constructing the clutch in the above described manner, is to provide a signal or indication that the armature is turning relative to the timing gears, or vice versa.

The advantage of this signal will appear more fully as the description of the operation and control of the system progresses.

The above mentioned clutch mechanism is positioned in the front end housing 34 of the electric machine. The rear end of the armature shaft 30 is extended beyond the end housing of the electric machine, as is clearly shown in Fig. 2, and carries a pinion 35.

The flywheel 36 of the combustion engine 21 is provided with a plurality of gear teeth 37, formed on or secured to the periphery thereof. The armature pinion 35 is adapted to be connected with the flywheel gear teeth, by means of the shiftable reduction gear mechanism 38, which comprises a relatively large ring gear 39 and a small gear wheel or pinion 40. The large ring gear 39 in said reduction gear, being adapted to couple the armature pinion and flywheel together, while the relatively small gear wheel 40 is adapted to be brought into mesh with the flywheel gear teeth 37.

The mechanism for operating said shiftable gearing comprises a rod 41, connected to said gear by means of the yoke member 42, which is secured to said rod intermediate its two ends. The rear end of this rod 41 is connected to an operating pedal 43, while the extreme front end of said rod extends through the end casing 44 of the electric machine 23, and is adapted to operate relative to the commutator brushes of said machine in a manner described more fully hereinafter.

Under certain conditions it will be found that when the aforesaid shiftable gearing is actuated to connect up the armature of the electric machine with the flywheel, the end faces of the enmeshing gears will lie in such a position as to conflict with each other. In order to facilitate the enmeshing action of these pinions, and also to substantially eliminate the conflicting of the respective gear teeth, the electric machine is adapted to have an initial motor operation imparted thereto, so that the armature pinion will be rotating relative to the pinions of the shiftable gearing, and thereby readily enmesh with the large pinion of the shiftable gearing.

This initial motor movement of the electric machine will be described in detail hereinafter, but it will be seen that by imparting this initial movement to the electric machine, the armature of said machine will tend to rotate relative to the shaft 24, and thereby cause the cam portion 31 of the front end clutch 27 to rotate relative to the external member 28 of said clutch, and thereby move the rollers or balls 33 over the depressions 29, as has been described heretofore.

Therefore, during the initial operation of the electric machine, this signaling device described heretofore will be in effect and will tend to indicate to the operator that the electric machine is operating correctly.

By referring to Fig. 7, the motor gear which comprises the reduction gearing 38, is shown as being provided with an internal clutch mechanism between the pinion 40 and the ring gear 39, which permits the engine, as soon as it has started, to operate under its own power, to carry the pinion 40 ahead of and relative to the ring gear 39 and the armature pinion 35.

This clutch mechanism is substantially the same as that shown and described in the co-pending applications of Charles F. Kettering, Serial No. 633,443, filed June 15, 1911, Patent 1,150,523 Aug. 17, 1915; Serial No. 721,237, filed September 19, 1912, Patent No. 1,240,348, Sept. 18, 1917, and the co-pending application of Charles T. Kettering and William A. Chryst, Serial No. 789,541, filed September 13, 1913, Patent 1,250,188, Dec. 18, 1917, and therefore no further detail description of this structure will be given.

By referring to Fig. 1 of the drawings, the electric machine will be seen to comprise a generator armature winding 45. This armature winding, as has been described heretofore, is connected with the accumulator 46, which in turn is in contact with the brushes 47 at all times.

The generator circuit is initially controlled by means of either one of the controlling elements 48 or 49, of the switch unit 50.

By describing the circuits affected by the operation of the elements 48 and 49 respectively, this will more clearly appear.

Supposing that the engine 21 is at rest, and it is desired to start the same, the following operations are necessary:

First, the element 48 of the switch 50 will be pulled outwardly, providing magneto or generator type of ignition is to be used, and this operation will close the following ignition circuit: from the storage battery or accumulator 51, the current will flow through the wire 52, wire 53, to the contact plate 54, across the conductive portion 55 of the pull button element 48, through one side of the common contact element 56, through the wire 57, the primary winding of the induction coil 58, timing device 59, through the wire 60, to the point 61.

At this point the current will branch, a portion thereof going through the resistance 62 to the ground connection 63, back to the other side of the battery, which has the ground connection 64. The other portion of the current will flow through the wire 65, through the resistance 66 to the contact wiper 67, back to the battery via the ground connections 68 and 64.

The novel structure and arrangement of the resistances 62 and 66, in combination with the contact wiper 67, have been clearly set forth in our co-pending application, Serial No. 851,259, filed July 16, 1914, and therefore no detail description of these parts is deemed necessary.

At the same time the above mentioned circuit is completed, by the operation of the pull button element 48, the sliding plate 69 will be forced laterally on the supporting plate or base 70, in such a manner as to close the contact plates 71 and 72 respectively.

The closing of these contacts will permit current to flow from the battery, through the wires 52 and 53, to the branch wire 73, through the contact plates 71 and 72 respectively, to the point 74, where the current will branch, a part thereof passing through one of the brushes 47, across the armature windings 45, the other brush 47 through the wire 75 to the contact plate 76. This plate 76 is normally in contact with the plate 77, and the current will therefore pass through these plates to the ground connection 78, back to the battery ground connection 64.

The other portion of the current which divides at the point 74, will pass through the shunt field winding 79 of the generator, through the wire 80, across the resistance 66, contact wiper 67 to the ground connection 68, and back to the battery, via the ground connection 64.

This will complete the generator circuit, and current will therefore flow as above stated, and actuate the electric machine 23 as a motor, but it will of course be understood that the torque effect of the machine, when operating under these conditions, will be much less than when the machine is operating under the influences of the regular motor windings.

As stated above, this closing of the generator circuit will cause the electric machine to operate as a motor, and it is this initial operation of the electric machine as a motor which facilitates the enmeshing operation of the shiftable gearing to connect the electric machine to the engine for starting purposes, as has been stated heretofore.

As heretofore described, the armature of the electric machine will rotate relative to the shaft 24 and therefore relative to the timing gears 26, during this initial movement and also during the actual starting operation.

This relative movement of the armature, as to the timing gears 26, will also tend to create a relative movement between the inner cam portion 31 of the front end driving clutch, and the outer or shell portion 28, inasmuch as the cam portion 31 is carried by the armature while the shell portion 28 is secured to the shaft 24.

It will therefore be apparent that as the cam portion rotates, the ball or roller members 33 will be carried around and as they pass the depressions 29, the rollers will tend to drop into and then be forced out of the said depressions. This action creates a clicking noise clearly audible to the operator, and constitutes a signal, immediately indicating to the operator that the generator armature is turning relative to its connecting shaft 24 and the timing gears of the engine.

It also indicates to the operator that the ignition system is in operative condition; that is, in the present instance, the ignition circuit is closed, because the same controlling element which closes the generator circuit to secure the initial motor operation, also effects the closure of the ignition circuit.

As soon as the initial movement of the electric machine 23 takes place, the operator will depress the pedal 43, which will shift the gearing 38 into position to couple up the electric machine 23 to the flywheel of the engine.

The operation of the pedal 43 will also effect the closing of the motor circuit, and the concurrent breaking of the generator circuit by rocking the motor brush holder 81, so as to bring the brush 82 into contact with the commutator 83, which movement will separate the contact plates 76 and 77.

This operation of the pedal 43 breaks the generator armature circuit, by opening the contact plates 76 and 77, and it concurrently closes the motor starting circuit which is as follows:

From the battery 51, current will flow through the wire 52, through the series winding 84, motor commutator brush 85, across the motor armature windings 86, brush 82, to the ground 78, back to the battery via the battery ground 64.

Throughout this starting operation it will be noted that the field circuit of the generator has remained closed, and is used accumulatively with the series winding 84, thus increasing the torque effect of the motor, when used for cranking the engine.

In view of the foregoing description, it will be understood that the signaling device, which is brought into effect by the rotation of the armature relative to the timing gears of the engine, will be in effect throughout the entire starting operation.

As soon as the engine has become self actuating, the operator releases the pedal 43, which will return to its normal position, through the influence of the spring 86, which will of course also return the shiftable gearing 38, into such a position as to disconnect the electric machine 23 from the engine.

Now, as soon as the engine speed becomes greater than a predetermined ratio of speed between the engine and the electric machine, the friction clutch illustrated in Fig. 4, will be brought into effect to couple the electric machine to the engine, through the connections heretofore described, and thus drive the machine as a generator.

The release of the pedal 33, also prmits the spring 86 to force the motor brush 82 out of contact with the commutator 83, and to bring the contact plates 76 and 77 together.

It will therefore be seen that the following circuit will be closed, so long as the pull button element 48 of the ignition system is maintained in its outward position:

From the generator armature windings 45, current will flow through the brush 47, to the point 74, where the field winding 79 of the generator is cut in. Of course, a portion of the current will divert and pass through the generator field 79, and across the resistance 66, contact wiper 67, ground 68 to the opposite brush of the generator, via the ground connection 78, contact plates 77 and 76 respectively.

The charging current will pass from the point 74 to the battery via the contact plates 71 and 72 respectively, through wires 73, 53 and 52, and from the battery 51, back to the opposite side of the generator through the grounds 64 and 78, contact plates 77 and 76 respectively, and wire 75.

The manner of controlling the generator output, and also controlling the ignition system, forms a part of our co-pending application, Serial No. 851,259, filed July 16, 1914, and therefore no description or showing of this means of regulation, other than that disclosed in Fig. 1, will be made.

Exactly the same operation and functioning of the several units will take place, if the pull button element 49 is operated instead of the element 48, with the exception that the batteries 87 will form a source of the ignition current, so that the current will flow through the wire 88, contact plate 89, across the conductive portion 90 of the element 49, to the common contact plate 56, from which point the circuits will be substantially the same as heretofore described, with reference to the circuits affected by the operation of the pull button element 48.

Supposing that the operator now stops or stalls the engine, without cutting off or breaking the generator and ignition circuit. It will be apparent, that as soon as the engine stops, if the generator and ignition circuits are not broken, current will immediately start to flow from the battery back through the generator circuits, and also through the ignition circuits, inasmuch as the voltage of the battery is of course greater than the voltage of the generator at this time.

This flow of current will not only tend to deplete the battery charge, but it may lead to dangerous effects on certain of the parts of both the ignition and generator system. However, just as soon as the current flows from the battery back through the generator, the armature of the electric machine will tend to rotate relative to the timing gears, and will of course actuate the driving clutch mechanism as has been described heretofore, and thereby create an audible noise which will act as a signal to the operator to actuate whichever of the switch controlling members is in operative position, in such a manner as to break the generator and ignition circuits.

By the expression "direct circuit connections," employed in some of the claims which follow, we wish it to be understood that we mean direct circuit connections in the sense that they are not interrupted by the interposition of an electrical automatic cutout relay or other automatic device, provided for the purpose of preventing the flow of current from the battery to the generator windings, when the battery voltage is greater than the generator voltage, as for example, when the engine stops. We also wish it to be understood that where we have referred in the claims herein to the stoppage of the engine, we mean by this expression to include the very low speed operation of the engine, which takes place prior to stoppage.

While the form of mechanism herein shown and described, constitutes a preferred form of embodiment of the invention, it is to be understood that other forms might be adopted, all coming within the scope of the claims which follow.

What we claim is as follows:

1. In a starting device, the combination with a combustion engine, of an electric machine capable of operation as a motor for starting purposes, and as a generator for charging purposes; and means made operative by an operating member when moved into position to permit the running of the engine, for signaling when said engine speed falls below the critical speed for driving the electric machine.

2. In a starting device, the combination with a combustion engine, of an electric machine having a shaft; shiftable means operable to connect one end of said shaft to the engine for starting purposes; and means for signaling when said shaft is operating and the engine is at rest, said means being separate from said shiftable means.

3. In a starting device, the combination with a combustion engine; of a generator; and automatic means controlled by the speed of the engine for connecting the generator to said engine, and having provisions for signaling when said generator is operating at a speed greater than the normal driving ratio of speed between said generator and engine.

4. In a starting device, the combination with a combustion engine; of an electric machine, operable as a motor for starting purposes, and as a generator; a reduction gear including a shiftable pinion for connecting the electric machine as a starting device to said engine; and means for connecting the electric machine to the engine as a generator, comprising a friction clutch separate from said reduction gear and shiftable pinion having provisions for audibly indicating when said machine is operating at a greater speed than the normal driving ratio of speed of said engine.

5. In an electrical system for combustion engines, the combination with a combustion engine; of an electric machine operable as a generator adapted to be driven by said engine; a battery; circuit connections controlled by an engine controlling member between the battery and the generator; and means for signaling when current is flowing from the battery to the generator.

6. In an electrical system for combustion engines, the combination with a combustion engine and an ignition system therefor; of an electric machine operable as a generator adapted to be driven by said engine; a battery; circuit connections between the battery and the generator controlled by an ignition switch; and means for signaling when said ignition switch is operated to close the generator circuit and current is flowing from the battery to the generator.

7. In an electrical system for combustion engines, the combination with a combustion engine; of an ignition system therefor; and means for signaling operative upon the concurrence of two conditions, first that the ignition switch is in operative condition, and second, that the engine is not operating.

8. In an electrical system for combustion engines, the combination with a combustion engine; of an ignition system for said engine, including circuit connections; an ignition switch for opening and closing said circuit connections; and means for signaling operative upon the concurrence of two conditions, first that the ignition switch is closed, and second that the engine is not operating.

9. The combination with an internal combustion engine, of electrical devices including operating means movable into a position to render said electrical devices operative and to concurrently control the engine; and means for producing a signal upon stoppage of the engine when said operating means are in the aforesaid position.

10. The combination with an internal combustion engine, of an electric current generator connected therewith; a battery; a switch movable into position to connect said generator with said battery and to control said engine; and means for producing a signal upon stoppage of the engine when said switch is in position to connect said generator with said battery.

11. The combination with an internal combustion engine; of an electrical ignition system therefor; a battery; a switch for connecting said ignition system with said battery; and automatic means for producing a signal upon stoppage of the engine when said switch is in position to connect said ignition system with said battery.

12. The combination with an internal combustion engine, of an electrical ignition system including operating means movable into a position to render said electrical ignition system operative; and automatic means including a percussive member adapted to set up a series of vibrations upon stoppage of the engine when said operating means are in the aforesaid position.

13. The combination with a non-automatically stopping internal combustion engine, of a manually-actuated operating member for stopping said engine, and means for producing a signal when said engine has stopped without the manual actuation of said operating member, and effective until said member has been manually actuated.

14. The combination with a non-automatically stopping internal combustion engine, of a battery, a current generating machine, an electrical circuit between said machine and said battery and an ignition system, with a single operating member controlling the connection of said battery with said machine and also controlling said ignition system, and signaling means operative when said operating member is in operative position when the engine falls below a certain speed or stops running.

15. The combination with an engine, of a current generating machine; a battery; a direct circuit connection between said current generating machine and said battery through which said machine charges said battery; an ignition system; a manually controlled switch, movable into open and closed positions to control the opening and closing of said direct circuit connection and concurrently controlling said ignition system; means connecting said machine with said engine whereby the engine drives said machine to charge the battery, with provisions for rendering said current generating machine ineffective relative to said engine, when the engine comes to rest with said switch in closed position for producing a signal upon slowing or stoppage of the engine, when said switch is in position to render the ignition system operative.

16. The combination with an engine, of a current generating machine; a battery; a direct circuit connection between said current generating machine and said battery through which said machine charges said battery; an ignition system; a manually controlled switch, movable into open and closed positions to control the opening and closing of said direct circuit connection and concurrently controlling said ignition system; speed-controlled means for rendering said current generating machine ineffective relative to said engine, when the engine comes to rest with said switch in closed position with provisions operated by said dynamo electric machine for producing a signal upon stoppage of the engine when said ignition switch is in position to render the ignition circuit operative.

17. The combination with an engine, of a current generating machine; a battery; a direct circuit connection between said current generating machine and said battery through which the machine charges said battery; an ignition system; a manually controlled switch, movable into open and closed positions to control the opening and closing of said circuit connections and concurrently controlling said ignition system; and automatic means for producing a signal upon stoppage of the engine, when said switch is in position to render the ignition system operative.

18. The combination with an engine, of a dynamo electric machine starting device therefor, including a generator field winding; a battery; direct circuit connections between said battery and dynamo electric machine; a switch in said connections movable into a position to establish a flow of battery current through said generator field and armature; means for maintaining said switch in said position; a second switch in said connections, adapted to break the circuit through the generator armature and close the motor armature and field circuit, to crank the engine; and a signaling device adapted to indicate when current is flowing through the generator field and armature winding, when the engine is at rest.

19. The combination with an engine, of a dynamo electric machine starting device therefor, including a generator field winding; a battery; direct circuit connectons between said battery and dynamo electric machine; a switch in said connections movable into a position to establish a flow of battery current through said generator field and armature; means for maintaining said switch in said position; a second switch in said connections, adapted to break the circuit through the generator armature and close the motor armature and field circuit, to crank the engine; mechanical connections between the dynamo electric machine and engine, including a roller clutch through which the engine drives the dynamo electric machine, with provisions whereby a signal is given when current is flowing through the generator field and armature winding, when the engine is at rest.

20. The combination with an internal combustion engine, of a starting device therefor, including a dynamo electric machine comprising a generator armature and field and a motor armature and field; connecting gearing between said starting device and said engine, comprising high ratio motor gearing and low ratio generator gearing, said generator gearing including a roller clutch with provisions whereby a signal is given when current is flowing through the generator field and armature winding, when the engine is at rest; a battery; direct electrical connections between said battery and said dynamo electric machine; a switch movable into a position to close said connections from the battery to the dynamo electric machine through the generator field and armature; means for maintaining said switch in said position; and another switch movable to temporarily disconnect the generator armature from the battery and close said connections between the battery and the motor armature and field circuit; means for returning said switch into a position to reëstablish the connection through the generator armature and break the connections to the motor circuit.

21. The combination with an internal combustion engine, of a starting device therefor, including a dynamo electric machine, comprising a generator armature and field, and a motor armature and field; connecting gearing between said starting device and said engine, comprising high ratio motor gearing and low ratio generator gearing, said generator gearing including a roller clutch with provisions whereby a signal is given when current is flowing through the generator field and armature winding, when the engine is at rest; a battery; direct electrical connections between said battery and said dynamo electric machine; an ignition system; a switch movable into a position to close said connections from the battery to the dynamo electric machine through the generator field and armature, and to connect said ignition system for operation; means for maintaining said switch in said position; another switch movable to temporarily disconnect the generator armature from the battery and close said connections between the battery and the motor armature and field circuit; means for returning said second switch into a position to reëstablish the connections through the generator armature and break the connections to the motor circuit.

22. In combination with an engine, a dynamo electric machine; a battery; direct circuit connections between said battery and dynamo electric machine; mechanical connections between said machine and said engine, including a roller clutch, provided with rolling elements; and a member formed with a surface having depressions therein, adapted to cause a metallic percussive signaling sound when acted on by said rolling elements, when said machine is running with the engine at rest.

23. The combination with an internal combustion engine, of an electrical starting device therefor, a battery, an operating member for connecting said starting device with said battery to condition said starting device for connection with the engine, and a signal brought into operation when the starting device is in condition for connection with the engine.

24. The combination with an internal combustion engine, of an electrical starting device therefor, a battery, connecting gearing between the electrical starting device and the engine including a shiftable pinion, an operating member for connecting said starting device with said battery to cause the operation of said starting device with an initial movement to facilitate the connection of said shiftable pinion with the engine, and a signal brought into operation when the starting device is in its initial movement.

25. The combination with an internal combustion engine; a battery; a dynamo electric machine; a direct circuit connection between said battery and dynamo electric machine through which the dynamo electric machine charges said battery; an operating member movable into one position to permit the engine to start and into another position to stop said engine, and controlling said direct circuit connection, and a signal operative only when the engine has stopped without movement of said operating member into position to stop the engine.

26. In an electrical system for combustion engines, the combination with a combustion engine; of an ignition system therefor, including a battery and a primary coil; means for signaling operative upon the concurrence of two conditions, first that the ignition system is in operative condition, and second, that the engine is not operating; and a resistance element in series with said primary coil adapted to resist discharge of said battery when the ignition system is in operative condition with current flowing therethrough and the engine is not operating.

In testimony whereof we affix our signatures in the presence of two subscribing witnesses.

CHARLES F. KETTERING.
WILLIAM A. CHRYST.

Witnesses:
J. W. McDONALD,
O. D. MOWRY.